United States Patent
Ishikawa et al.

(10) Patent No.: US 7,470,414 B2
(45) Date of Patent: Dec. 30, 2008

(54) HIGH PURITY PHOSPHORIC ACID AND PROCESS OF PRODUCING THE SAME

(75) Inventors: Kenichi Ishikawa, Chita-gun (JP); Keizou Yokoi, Chita-gun (JP); Kosuke Takeuchi, Chita-gun (JP); Yutaka Kurita, Chita-gun (JP); Heiji Uchiyama, Koto-ku (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 485 days.

(21) Appl. No.: 10/539,441

(22) PCT Filed: Jun. 28, 2004

(86) PCT No.: PCT/JP2004/009112

§ 371 (c)(1), (2), (4) Date: Jun. 20, 2005

(87) PCT Pub. No.: WO2005/003026

PCT Pub. Date: Jan. 13, 2005

(65) Prior Publication Data

US 2006/0073088 A1 Apr. 6, 2006

(30) Foreign Application Priority Data

Jul. 1, 2003 (JP) .............................. 2003-189631

(51) Int. Cl.
*C01B 25/18* (2006.01)
*C01B 25/234* (2006.01)
(52) U.S. Cl. .................................... 423/317; 423/321.1
(58) Field of Classification Search ................. 423/317, 423/321.1
See application file for complete search history.

(56) References Cited

U.S. PATENT DOCUMENTS 2,174,158 A  9/1939  Kepfer et al.

(Continued)

FOREIGN PATENT DOCUMENTS

DE  2 109 970 A1  9/1972

(Continued)

OTHER PUBLICATIONS

John H. Perry's Chemical Engineers' Handbook, Fourth Edition, McGraw-Hill Book Company (1963), pp. 14-2 through 14-6, no month.*

(Continued)

*Primary Examiner*—Wayne A. Langel
(74) *Attorney, Agent, or Firm*—Westerman, Hattori, Daniels & Adrian, LLP.

(57) ABSTRACT

High purity phosphoric acid having an Sb content of 200 ppb or less and a sulfide ion content of 200 ppb or less as impurity contents on a 85 weight percent $H_3PO_4$ basis. The high purity phosphoric acid is useful as an etching solution for semiconductor devices having a silicon nitride film, an etching solution for liquid crystal display panels having an alumina film, a metallic aluminum etching solution, an alumina etching solution for ceramics, a raw material of phosphate glass for optical fiber, a food additive, and so forth. A metallic material having low capability of forming a lithium compound penetrates through the whole thickness of the active material layer 5.

8 Claims, 1 Drawing Sheet

U.S. PATENT DOCUMENTS

| | | | |
|---|---|---|---|
| 3,790,661 A | | 2/1974 | Wasel-Nielen et al. |
| 4,777,028 A | * | 10/1988 | Schrodter ................ 423/321.1 |
| 4,804,526 A | * | 2/1989 | Hall et al. ................ 423/321.1 |
| 4,816,241 A | * | 3/1989 | Bierman et al. .......... 423/321.1 |

FOREIGN PATENT DOCUMENTS

| | | | |
|---|---|---|---|
| JP | 44-14692 | | 6/1969 |
| JP | 56-73608 | * | 6/1981 ............. 423/321.1 |
| JP | 62-191409 | | 8/1987 |
| JP | 1-131009 | | 5/1989 |
| JP | 06-048712 A | | 2/1994 |
| JP | 06-171913 A | | 6/1994 |
| JP | 171913 | | 6/1994 |
| WO | WO 00/40507 | | 7/2000 |

OTHER PUBLICATIONS

Oimura et al., Toyo Soda Kenkyu Hokoku, vol. 10, No. 2, p. 21 (1996), no month.

Aoyama et al., Proceedings of the Sixth Symposium n Industrial Crystallization, pp. 413-420 (1976), no month.

Office Action dated Sep. 26, 2006 issued in corresponding Korean Application No. 10-2005-7011686.

Notification of Transmittal of Translation of the International Preliminary Report on Patentability (Form PCT/IB/338) of International Application No. PCT/JP2004/009112 mailed Jun. 1, 2006 with Forms PCT/IB/373 and PCT/ISA/237.

Search Report and Written Opinion (from Austrian Patent Office) dated Sep. 21, 2007 issued in corresponding Singapore Application No. 2005 04266-8.

Communication dated Sep. 24, 2007, issued in corresponding European Application No. 04 746 581.0.

European Search Report dated Jun. 15, 2007 issued in corresponding European Application No. EP 04 74 6581.

* cited by examiner

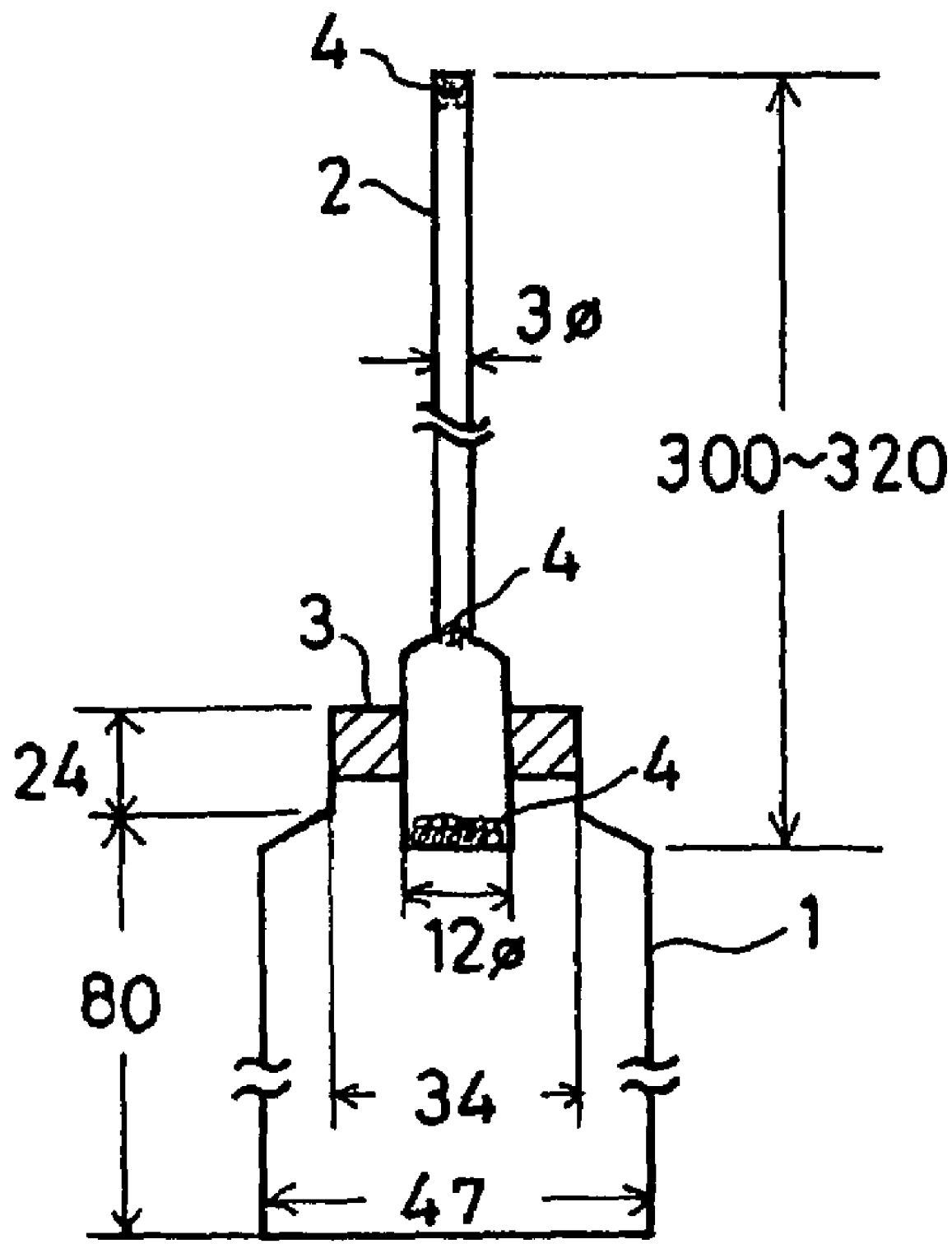

HIGH PURITY PHOSPHORIC ACID AND PROCESS OF PRODUCING THE SAME

TECHNICAL FIELD

This invention relates to high purity phosphoric acid and a process of producing the same. More particularly, it relates to high purity phosphoric acid that is substantially free from impurities causing deterioration in electrical characteristics of fine devices and suitable for use in electronics, for example for removing a silicon nitride film, etc. by etching in the semiconductor manufacture, and a process of producing the same. By virtue of its low impurity content, the high purity phosphoric acid of the invention is useful as not only an etching solution for semiconductors but an aluminum etching solution, an etching solution for liquid crystal devices, an alumina etching solution for ceramics, and a material of phosphate glass for optical fiber.

BACKGROUND ART

It is known that processes for producing phosphoric acid include a dry process and a wet process. In the manufacture of phosphoric acid by the dry process, phosphate rock is reduced in an electric furnace, and the resulting yellow phosphorus is burnt into diphosphorus pentoxide, which is hydrated to obtain phosphoric acid. In the wet process, phosphate rock is decomposed with sulfuric acid, and produced calcium sulfate is separated to obtain dilute phosphoric acid, which is then concentrated into high concentration acid. By whichever process it is produced, phosphoric acid is required to have high purity in electronics applications.

Phosphoric acid from the dry process (dry-process phosphoric acid), which is produced via yellow phosphorus, contains less impurity of phosphate rock origin and is said to have better quality than that from the wet process. High purity phosphoric acid from the dry process with a purity ranging 75% to 85% by weight is used in etching of semiconductors. If phosphoric acid for this application contains much antimony or arsenic as impurity metals, fine particles of these impurity metals tend to remain on silicon wafers depending on equipment for the semiconductor fabrication. Such impurity metal particles can cause trouble in the following step or necessitate an extra step for washing the particles off the wafer. Hence, it has been demanded to provide phosphoric acid with still higher purity.

A process for purifying phosphoric acid of 75% to 85% by weight concentration as $H_3PO_4$ containing antimony and arsenic as impurity metals to make it acceptable for electrical semiconductor use is known (see Patent Document 1), in which hydrogen sulfide is added to the phosphoric acid to precipitate the impurity metals in the acid, and the precipitate is separated from the treated acid at a temperature of at least 60° C. According to the purification process, phosphoric acid after the purification having a concentration of 85% as weight percent $H_3PO_4$ contains 13 to 20 ppm of antimony and 0.02 to 0.1 ppm of arsenic.

A method of removing arsenic by bringing phosphoric acid into contact with a hydrogen halide is also known (see Patent Document 2). The method is capable of reducing arsenic in phosphoric acid to 1 ppm or less. The publication also says that, when the contact between phosphoric acid and a hydrogen halide is in the presence of a compound capable of generating a hydrogen halide under an acidic condition, the arsenic removing effect increases to reduce the arsenic content in the resulting phosphoric acid to 0.1 ppm or lower. According to the disclosure, however, the arsenic content of phosphoric acid ($P_2O_5$ concentration: 65%) reached in the working example is only about 0.07 to 0.8 ppm, which level does not sufficiently meet the demand for high purity phosphoric acid. Moreover, the method needs hydrogen peroxide, and iron chloride or tin chloride must be used before bubbling hydrogen chloride in order to achieve sufficient removal of arsenic.

Apart from the above-described methods, a technique of purifying phosphoric acid by crystallization is widely known (see e.g., Patent Document 3). This patent document discloses a process in which a series of purification operations consisting of crystallization, separation from the mother liquor, and melting is repeated three times to obtain desired phosphoric acid purity. Basic physical property data necessary in purifying phosphoric acid by crystallization are known (see Non-Patent Document 1), including saturation solubility, correlation between supersaturation and crystal growth rate, hygroscopicity of phosphoric acid hemihydrate crystals, and crystal sedimentation rate in phosphoric acid. There are also reports on specific applications to a fluidized bed crystallization system (see Non-Patent Document 2). However, there is no clear description about the purity of phosphoric acid obtained by crystallization operation. In addition, crystallization operation has a disadvantage of increase in cost.

Patent Document 1: JP-A-1-131009
Patent Document 2: WO 00/40507
Patent Document 3: JP-B-44-14692
Non-Patent Document 1: Oimura et al., Toyo Soda Kenkyu Hokoku, 10, 2, 21 (1966)
Non-Patent Document 2: Aoyama et al., Proceedings of a Conference of Industrial Crystallization, pp. 413-420 (1976)

DISCLOSURE OF THE INVENTION

An object of the present invention is to provide high purity phosphoric acid with extremely reduced contents of antimony, an impurity metal that has hitherto been regarded difficult to remove, and sulfide ions and a process of producing such high purity phosphoric acid.

The present invention accomplishes the above object by providing high purity phosphoric acid having an Sb content of 200 ppb or less and a sulfide ion content of 200 ppb or less as impurity contents on a 85 weight percent $H_3PO_4$ basis.

The present invention also accomplishes the above object by providing a process of producing high purity phosphoric acid comprising a first step of blowing hydrogen sulfide gas in excess into crude phosphoric acid containing an impurity metal to precipitate the impurity metal in the form of a sulfide, a second step of filtering the phosphoric acid from the first step, and a third step of bringing the phosphoric acid from the second step into contact with air in a removal tower to remove hydrogen sulfide gas from the phosphoric acid, the first and the second steps being carried out at 59° C. or lower.

BRIEF DESCRIPTION OF THE DRAWING

The FIGURE is a diagram illustrating the method of sulfide ion analysis.

BEST MODE FOR CARRYING OUT THE INVENTION

The present invention will be described in detail. Unless otherwise noted, all the percents, parts per billion (ppb) and parts per million (ppm) are by weight. "Phosphoric acid" as referred to in the description is a mixed liquid of a component represented by formula: $H_3PO_4$ and $H_2O$ in an arbitrary mixing ratio. "High purity phosphoric acid" as referred to in the description denotes phosphoric acid from the dry or wet process having an $H_3PO_4$ concentration of from 75% to 89%. In the dry process, combustion of yellow phosphorus is followed by hydration to obtain crude phosphoric acid, which is purified into high purity phosphoric acid. In the wet process, phosphate rock is decomposed with an inorganic strong acid followed by concentration to obtain crude phosphoric acid, which is purified into high purity phosphoric acid. The concentration of high purity phosphoric acid is determined by titration with sodium hydroxide as specified in JIS K-1499. The phosphoric acid concentration is represented in terms of mass ratio of the elements per unit phosphoric acid mass.

Strongly corrosive to various kinds of metals, the high purity phosphoric acid of the invention is suitable as an etching solution for the surface of metals, etc. It is not easy to purify phosphoric acid by distillation because of its low vapor pressure compared with other mineral acids. Moreover, industrial purification is practically very difficult. Notwithstanding such difficulties of purification, the high purity phosphoric acid according to the present invention has a low content of Sb, an impurity metal.

Specifically, the high purity phosphoric acid of the present invention has an Sb content of 200 ppb or lower, preferably 100 ppb or lower, still preferably 50 ppb or lower, as an impurity content on an 85% $H_3PO_4$ basis. If the Sb content exceeds 200 ppb, high purity phosphoric acid can cause troubles such as adhesion of Sb particles on the surface of a silicon wafer, etc. when used as an etching solution for electronic devices such as semiconductor devices and liquid crystal display panels.

Besides having the above-recited Sb content, the high purity phosphoric acid of the invention has a sulfide ion content of 200 ppb or lower as an impurity content on an 85% $H_3PO_4$ basis. In a preferred embodiment of the invention, hydrogen sulfide is used as means for removing impurity metals from phosphoric acid as will be obvious from the process of producing high purity phosphoric acid described infra. It can follow that sulfide ions unavoidably remain in the phosphoric acid after impurity metal removal. Additionally, the phosphoric acid contains sulfides, such as arsenic sulfide and antimony sulfide, which are not removable by filtration. If high-purity phosphoric acid having a sulfide ion content exceeding 200 ppb is used for etching, e.g., a thin Ag film or an Ag electrode layer formed on reflective film of a reflective liquid crystal display panel, the sulfide ions react with silver to form silver sulfide, which can damage the product qualities. The high purity phosphoric acid of the present invention eliminates such disadvantages since it has an extremely small impurity metal content and, in addition, a markedly reduced content of sulfide ions used for the impurity metal removal. That is, the high purity phosphoric acid of the invention satisfies the two conflicting requirements, reduction in impurity metal and reduction in sulfide ion. The terminology "sulfide ions" as used herein denotes the total sulfide present in phosphoric acid, including the sulfides formed as a result of blowing hydrogen sulfide in phosphoric acid (e.g., antimony sulfides and arsenic sulfides) and residual hydrogen sulfide.

It is preferred that the high purity phosphoric acid of the invention have an As content of 10 ppb or lower, still preferably 2 ppb or lower, as an impurity content on a 85% $H_3PO_4$ basis for the same reasons as mentioned with respect to the Sb content. Measurement of an As or Sb content in phosphoric acid is made with an ICP emission spectrometer equipped with a hydride generator (ICP-HYD). The details of the measurement will be described in Examples given later. The method of sulfide ion measurement will also be described in Examples.

Metal ions such as Sb and As are essentially present in yellow phosphorus and are carried over into crude phosphoric acid. Hence, it is desirable to start with high purity yellow phosphorus in order to obtain high purity phosphoric acid. It is very difficult nevertheless to get highly purified yellow phosphorus with its Sb or As reduced to the order of ppb.

The high purity phosphoric acid according to the invention is not particularly limited in application. For example, it is suitably used as an etching solution for removing a silicon nitride film in the semiconductor device manufacture, an etching solution for removing an alumina film in the liquid crystal display panel manufacture, a metallic aluminum etching solution, an alumina etching solution for ceramics, and a raw material of phosphate glass for optical fiber.

In the semiconductor fabrication steps involving micro processing, in particular, use of the high purity phosphoric acid of the invention as an etching solution for silicon nitride film removal results in no impurities of Sb origin remaining on an etched silicon wafer. Impurities known to be present in phosphoric acid include As, Fe, Mn, and Na as well as Sb. Of these impurities, those of Sb origin have been revealed as a result of the present inventors' researches to give the most adverse influences in the field of semiconductor micro processing, especially micro processing on the order of 0.5 microns or less in line width. Thus the high purity phosphoric acid of the invention with a reduced Sb content is extremely useful as an etching solution in the semiconductor micro processing. For the same reason, the high purity phosphoric acid of the invention is also extremely useful as an etching solution in micro processing an electronic circuit of a liquid crystal display panel.

The process of producing the high purity phosphoric acid according to the present invention will then be described. The steps involved in the process of the invention are roughly divided into first to third steps. The first step is an absorption step, in which a large excess of hydrogen sulfide gas is blown into crude phosphoric acid containing impurity metals such as Sb and As to precipitate the impurity metals in the crude phosphoric acid in the form of their sulfides. The second step is a filtration step, in which the crude phosphoric acid from the first step is filtered. It is important that the first and the second steps be carried out at 59° C. or lower. The third step is a degassing step, in which the phosphoric acid from the second step is brought into contact with air in a removal tower to remove hydrogen sulfide gas from the phosphoric acid. Understandably, the process of the present invention allows for continuous and efficient production of high purity phosphoric acid. Each of the steps will hereinafter be described in detail.

The crude phosphoric acid used in the first step is obtained either by the dry process or the wet process. The one from dry process is preferred. Whichever process is followed, the crude phosphoric acid has an Sb content of about 1 to 10 ppm and an As content of about 10 to 100 ppm on a 85% $H_3PO_4$ basis. Preparation of crude phosphoric acid through the dry process is carried out, for example, as follows. Any industrially available yellow phosphorus ($P_4$) species can be used as a raw material. Yellow phosphorus usually contains 4 to 40 ppm of Sb. Needless to add, yellow phosphorus with more Sb is employable as a raw material.

Liquid yellow phosphorus is burnt with air in a combustion furnace to produce diphosphorus pentoxide gas, which is then hydrated to produce crude phosphoric acid. The reactions involved are represented by the following reaction formulae:

$$P_4 + 5O_2 \rightarrow P_4O_{10} \qquad (1)$$

$$P_4O_{10} + 6H_2O \rightarrow 4H_3PO_4 \qquad (2)$$

Preparation of crude phosphoric acid through the wet process is carried out, for example, as follows. The wet process for the production of phosphoric acid typically includes the step of dearsenation, in which phosphate rock is decomposed with sulfuric acid, the resultant calcium sulfate is separated to obtain dilute phosphoric acid, which is concentrated to about 40%, and arsenic and solid matter are separated from the phosphoric acid; the step of oxidation, in which the organic matter dissolved in the phosphoric acid is oxidatively decomposed; the step of extraction and washing, in which the phosphoric acid is mixed with isopropyl alcohol, and the mixture is separated into an extract and a residue; the step of sodium removal, in which the extract is treated with an ion exchange resin to remove the sodium content by adsorption; the step of deisopylation, in which the sodium-free extract is separated into phosphoric acid and isopropyl alcohol; the step of defluorination and deisopropylation, in which a trace amount of residual isopropyl alcohol and fluorine are separated from the phosphoric acid; the step of organic matter removal, in which organic matter remaining unremoved by the oxidation/reduction is removed with activated carbon; and the step of concentration, in which the phosphoric acid is concentrated to 75% and further to 85%. While various steps have been proposed for the production of wet-process phosphoric acid, the phosphoric acid before the dearsenation step is taken as crude phosphoric acid in the present invention.

Hydrogen sulfide gas is blown into the thus prepared crude phosphoric acid. As a result of the present inventors' study, it has been found that the temperature of the crude phosphoric acid through which hydrogen sulfide gas is to be blown is of extreme importance in the present invention. Specifically, the temperature of the crude phosphoric acid in which hydrogen sulfide gas is blown is 59° C. or lower. It is preferred that the temperature is as low as possible. The temperature is decided taking the solidification point of phosphoric acid into account. For example, the temperature is kept usually between 20° and 59° C., preferably between 20° and 40° C., when the $H_3PO_4$ concentration is 85% by weight. The present inventors' investigation has revealed that antimony sulfides formed by the reaction between hydrogen sulfide gas and Sb can be precipitated in a large quantity thereby to reduce the Sb content of the phosphoric acid to an extremely low level by controlling the temperature of the crude phosphoric acid at or below the recited temperature at the time of, or after, blowing hydrogen sulfide gas.

It has also been proved significant to feed hydrogen sulfide gas in excess in the step of absorption. There is no upper limit to the amount of hydrogen sulfide to be fed. The larger the excess, the more the production of Sb or As sulfides is accelerated. Feeding hydrogen sulfide in too large excess is meaningless, though, because the sulfide production would be saturated. Taking production cost into consideration, it would be the best mode to control the upper limit of the hydrogen sulfide feed within the solubility in the phosphoric acid.

Blowing hydrogen sulfide gas into the phosphoric acid is preferably effected by causing the crude phosphoric acid to flow down from the top of an absorption tower while causing hydrogen sulfide gas to rise from the bottom of the absorption tower so as to bring them into countercurrent contact. The contact between the phosphoric acid and hydrogen sulfide gas may be by a parallel flow. By the above method, hydrogen sulfide gas can be made to react with the impurities in the phosphoric acid efficiently. The absorption tower is preferably packed with a packing, such as tellerettes or saddles, so as to sufficiently assure the contact between phosphoric acid and hydrogen sulfide gas. By blowing hydrogen sulfide gas, Sb, As, and other impurity metals are converted to water-insoluble sulfides and precipitated in the crude phosphoric acid. The reactions between hydrogen sulfide gas and Sb and As are represented as follows.

$$Sb_2O_3 + 3H_2S \rightarrow Sb_2S_3 + 3H_2O \qquad (3)$$

$$Sb_2O_5 + 5H_2S \rightarrow Sb_2S_5 + 5H_2O \qquad (4)$$

$$As_2O_3 + 3H_2S \rightarrow As_2S_3 + 3H_2O \qquad (5)$$

$$As_2O_5 + 5H_2S \rightarrow As_2S_5 + 5H_2O \qquad (6)$$

The crude phosphoric acid after hydrogen sulfide gas blowing is subjected to the second step. It is preferred that the crude phosphoric acid from the first step be aged to let the Sb and As sulfides be precipitated sufficiently. The aging time is 1 to 10 hours. In carrying out the aging step in practice, an aging time of 2 to 4 hours usually suffices to let the sulfides precipitate sufficiently. No special operation is needed for aging. Aging can be effected simply by maintaining the crude phosphoric acid in the tank at the hydrogen sulfide blowing temperature, e.g., 59° C. or lower, preferably about 20° to 40° C., in case where the $H_3PO_4$ concentration of the phosphoric acid is 85% by weight.

The second step (the step of filtering off the sulfides) is also carried out at 59° C. or lower similarly to the first step. The filtration temperature is decided taking into consideration the solidification point and the viscosity of the phosphoric acid and the capability of the filter (filtration area). At an $H_3PO_4$ concentration of 85%, for instance, the filtration temperature is usually 20° to 59° C., preferably 20° to 40° C. Seeing that high purity phosphoric acid having high concentrations is a viscous liquid at ambient temperature, it would be advantageous for filtration to raise the temperature of the phosphoric acid to reduce its viscosity. However, if the temperature of the phosphoric acid is elevated too high, the sulfides once precipitated in the phosphoric acid would increase solubility and re-dissolve in the phosphoric acid.

The manner of filtration is not particularly restricted. Seeing that the filtration temperature is relatively low, at which the phosphoric acid has a relatively high viscosity, it is advantageous to use filtration equipment providing a wide filtration area. The filtration mode includes pressure filtration and vacuum filtration. Filtration using a pressure leaf filter, such as an ultrafilter press, is particularly preferred. Sb or As sulfides can be removed with the ultrafilter press.

The phosphoric acid obtained by the filtration is clear and has an Sb content of 200 ppb or lower and an As content of 10 ppb or lower on a 85% $H_3PO_4$ basis.

The use of hydrogen sulfide for the removal of impurity metals results in excess hydrogen sulfide remaining in the resulting phosphoric acid. In order to remove the excess hydrogen sulfide, air is bubbled through the phosphoric acid in the third step. As a result, the sulfide ion concentration is reduced to 200 ppb or lower to provide highly purified phosphoric acid of the present invention.

Removal of excess hydrogen sulfide from the phosphoric acid is preferably carried out by, for example, causing the phosphoric acid to flow down from the top of a removal tower while causing air to rise from the bottom of the removal tower so as to bring them into countercurrent contact. The contact between the phosphoric acid and air may be by a parallel flow.

The removal tower is preferably packed with a packing, such as tellerettes or saddles, so as to sufficiently assure the contact between phosphoric acid and air. Because high purity phosphoric acid has a high viscosity as stated above, removal of impurity gas dissolved in phosphoric acid has been usually carried out in a heating mode, in which air is blown into a heated vessel. In contrast, the present inventors have found that hydrogen sulfide dissolved in high viscosity phosphoric acid can easily be removed by the use of a removal tower packed with a packing. According to this method, removal of hydrogen sulfide gas can be achieved economically.

In the third step (degassing step), the phosphoric acid temperature is set at or above the solidification temperature, usually 25° C. or higher, preferably 50° to 65° C. By this step dissolved hydrogen sulfide gas is released from the phosphoric acid almost completely. Where necessary depending on the concentration of dissolved hydrogen sulfide gas or the quantity of the phosphoric acid to be treated, a plurality of removal towers connected in series can be used. In this case, the phosphoric acid and air are brought into contact in a countercurrent or parallel flow in each of the removal towers.

The present invention is not limited to the foregoing embodiments. For instance, the process of obtaining the high purity phosphoric acid of the invention is not limited to the above-described one. Any process will do as long as the Sb and the sulfide ion contents can be reduced to the respective recited levels.

EXAMPLES

The present invention will now be illustrated in greater detail with reference to Examples, but it should be understood that the invention is not construed as being limited thereto.

Example 1

(1) First Step

Liquid yellow phosphorus was burned with air in a combustion tower, and resulting diphosphorus pentoxide gas was hydrated to prepare crude phosphoric acid. The yellow phosphorus was fed with a burner to the combustion tower, into which air was blown in excess to allow for complete combustion. The combustion gas was cooled and hydrated while passing through a cooling tower to obtain crude phosphoric acid having an $H_3PO_4$ concentration of 86 wt %. The crude phosphoric acid contained 4 ppm of Sb and 40 ppm of As.

The crude phosphoric acid (86%) was adjusted to 35° C. and fed into an absorption tower packed with a packing (tellerettes) from the top while hydrogen sulfide gas was fed in excess from the bottom. As a result, the phosphoric acid and hydrogen sulfide gas were brought into sufficient contact in a countercurrent flow, thereby to produce water-insoluble sulfides of Sb and As as a precipitate. The amount of blown hydrogen sulfide gas was 10 times the total equivalent of Sb and As on a 85% crude phosphoric acid ($H_3PO_4$) basis.

The crude phosphoric acid as containing the water insoluble sulfides was aged at about 35° C. for 2 hours.

(2) Second Step

After the aging, the crude phosphoric acid was passed through a leaf filter (ultrafilter press) under pressure to remove the insoluble sulfides thereby to give clear phosphoric acid. The temperature of the phosphoric acid while being filtered was 30° C.

(3) Third Step

The resulting clear phosphoric acid was heated to 60° C. and fed into a removal tower packed with a packing (tellerettes) from the top while air was blown from the bottom. The phosphoric acid and air were thus brought into sufficient contact in a countercurrent flow thereby to remove the excess hydrogen sulfide dissolved in the phosphoric acid. Pure water was added to the treated phosphoric acid to obtain high purity phosphoric acid having an $H_3PO_4$ concentration of 85 wt %.

Example 2

(1) First Step

Crude phosphoric acid was prepared in the same manner as in Example 1. The crude phosphoric acid contained 4 ppm of Sb and 40 ppm of As. The crude phosphoric acid (86%) was adjusted to 58° C. and fed into an absorption tower packed with a packing (tellerettes) from the top while hydrogen sulfide gas was fed in excess from the bottom. As a result, the phosphoric acid and hydrogen sulfide gas were brought into sufficient contact in a countercurrent flow, thereby to produce water-insoluble sulfides of Sb and As as a precipitate. The amount of blown hydrogen sulfide gas was 10 equivalents per total equivalent of Sb and As on a 85% crude phosphoric acid ($H_3PO_4$) basis.

The crude phosphoric acid as containing the water insoluble sulfides was aged at about 55° C. for 2 hours.

(2) Second Step

After the aging, the crude phosphoric acid was passed through a leaf filter (ultrafilter press) under pressure to remove the insoluble sulfides thereby to give clear phosphoric acid. The temperature of the phosphoric acid while being filtered was 52° C.

(3) Third Step

The resulting clear phosphoric acid was heated to 60° C. and fed into a removal tower packed with a packing (tellerettes) from the top while air was blown from the bottom. The phosphoric acid and air were thus brought into sufficient contact in a countercurrent flow thereby to remove the excess hydrogen sulfide dissolved in the phosphoric acid. Pure water was added to the treated phosphoric acid to obtain high purity phosphoric acid having an $H_3PO_4$ concentration of 85 wt %.

Example 3

(1) First Step

Crude phosphoric acid was prepared in the same manner as in Example 1. The crude phosphoric acid contained 4 ppm of Sb and 40 ppm of As. The crude phosphoric acid (86%) was adjusted to 40° C. and fed into an absorption tower packed with a packing (tellerettes) from the top while hydrogen sulfide gas was fed in excess from the bottom. As a result, the phosphoric acid and hydrogen sulfide gas were brought into sufficient contact in a countercurrent flow, thereby to produce water-insoluble sulfides of Sb and As as a precipitate. The amount of blown hydrogen sulfide gas was 10 equivalents per total equivalent of Sb and As on a 85% crude phosphoric acid ($H_3PO_4$) basis.

The crude phosphoric acid as containing the water insoluble sulfides was aged at about 38° C. for 2 hours.

(2) Second Step

After the aging, the crude phosphoric acid was passed through a leaf filter (ultrafilter press) under pressure to remove the insoluble sulfides thereby to give clear phosphoric acid. The temperature of the phosphoric acid while being filtered was 36° C.

(3) Third Step

The resulting clear phosphoric acid was heated to 60° C. and fed into a removal tower packed with a packing (tellerettes) from the top while air was blown from the bottom. The phosphoric acid and air were thus brought into sufficient contact in a countercurrent flow thereby to remove the excess hydrogen sulfide dissolved in the phosphoric acid. Pure water was added to the treated phosphoric acid to obtain high purity phosphoric acid having an $H_3PO_4$ concentration of 85 wt %.

Example 4

(1) First Step

Crude phosphoric acid was prepared in the same manner as in Example 1. The crude phosphoric acid contained 4 ppm of Sb and 40 ppm of As. The crude phosphoric acid (86%) was adjusted to 35° C. and fed into an absorption tower packed with a packing (tellerettes) from the top while hydrogen sulfide gas was fed in excess from the bottom. As a result, the phosphoric acid and hydrogen sulfide gas were brought into sufficient contact in a countercurrent flow, thereby to produce water-insoluble sulfides of Sb and As as a precipitate. The amount of blown hydrogen sulfide gas was 10 equivalents per total equivalent of Sb and As on a 85% crude phosphoric acid ($H_3PO_4$) basis.

The crude phosphoric acid as containing the water insoluble sulfides was aged at about 35° C. for 2 hours.

(2) Second Step

After the aging, the crude phosphoric acid was passed through a leaf filter (ultrafilter press) under pressure to remove the insoluble sulfides thereby to give clear phosphoric acid. The temperature of the phosphoric acid while being filtered was 30° C.

(3) Third Step

The resulting clear phosphoric acid was heated to 40° C. and fed into a removal tower packed with a packing (tellerettes) from the top while air was blown from the bottom. The phosphoric acid and air were thus brought into sufficient contact in a countercurrent flow thereby to remove the excess hydrogen sulfide dissolved in the phosphoric acid. Pure water was added to the treated phosphoric acid to obtain high purity phosphoric acid having an $H_3PO_4$ concentration of 85 wt %.

Comparative Example 1

(1) First Step

Crude phosphoric acid was prepared in the same manner as in Example 1. The crude phosphoric acid contained 4 ppm of Sb and 40 ppm of As. The crude phosphoric acid (86%) was adjusted to 65° C., and hydrogen sulfide gas was blown therein in excess. As a result, water-insoluble sulfides of Sb and As were produced as a precipitate. The amount of blown hydrogen sulfide gas was 10 equivalents per total equivalent of Sb and As on a 85% crude phosphoric acid ($H_3PO_4$) basis.

The crude phosphoric acid as containing the water insoluble sulfides was aged at about 64° C. for 2 hours.

(2) Second Step

After the aging, the crude phosphoric acid was passed through a leaf filter (ultrafilter press) under pressure to remove the insoluble sulfides thereby to give clear phosphoric acid. The temperature of the phosphoric acid while being filtered was 63° C.

(3) Third Step

The resulting clear phosphoric acid was heated to 60° C. and fed into a removal tower packed with a packing (tellerettes) from the top while air was blown from the bottom. The phosphoric acid and air were thus brought into sufficient contact in a countercurrent flow thereby to remove the excess hydrogen sulfide dissolved in the phosphoric acid. Pure water was added to the treated phosphoric acid to obtain high purity phosphoric acid having an $H_3PO_4$ concentration of 85 wt %.

Evaluation of Performance:

The phosphoric acids obtained in Examples and Comparative Example were analyzed for Sb and As contents and for sulfide ion content in accordance with the following methods. The results obtained are shown in Table 1 below.

[I] Analysis of Sb (a) A sample weighing 50.0 g was put into a 200 ml beaker. Water was added to make about 100 ml. A few boiling stones were added to prevent bumping. The beaker was covered with a watch glass, and the sample was boiled on an electric heater to be concentrated to about 50 ml.

(b) Preparation of Sample Solution for ICP (JY 238)

After cooling, the liquid was transferred to a 100 ml measuring flask. Into the flask was put 10 ml of arsenic-free hydrochloric acid (35 to 37%), and water was added to fill up to the mark on the measuring flask. The flask was shaken. Separately, 10 ml of arsenic-free hydrochloric acid (35 to 37%) was put into each of two 100 ml measuring flasks for the preparation of a blank solution and a standard Sb solution (Sb: 0.2 ppm)

(c) The Sb content of the sample solution was measured with an ICP spectrometer by vaporizing the sample by reduction. The measuring wavelength was 231.147 nm, and the standard solution (Sb: 0.2 ppm) was used.

(d) The Sb content was calculated from equation:

Sb content $(ppb)$=reading $(ppb)$×100/sample weight $(g)$

The following is the operation procedure for the ICP-HYD system.

The ICP spectrometer was turned on at least one hour before use for stabilization.

1) Preparation of Solutions (a) HCl (arsenic-free, 35-37%) was added to each of the blank solution, the standard solution, and the sample solution in an amount of 1 mol (10 ml HCl/100 ml).

(b) 1% $NaBH_4$ solution: $NaBH_4$ accurately weighing 10 g and 20 g of NaOH were put in a 1000 ml beaker and dissolved by adding about 500 ml of water. The solution was diluted with water to make 1000 ml.

(c) Rinse solution: HCl 2 mol

2) ICP-HYD Operating Conditions
Power: 1.0 kW or 1.2 kW
Plasma gas flow rate: 12-14/min
Nebulizer flow rate: 0.6/min (the pressure approximated zero.)
Sheath gas flow rate: 0.4 l/min
After the plasma was stabilized, the tube was put into the rinse solution and the $NaBH_4$ solution.

3) Measurement (a) A configuration file for Sb analysis HYD method was set up.

(b) The blank solution and the standard solution were analyzed in that order to prepare a calibration curve. The sample solution was then analyzed.

[II] Analysis of As

Antimony analysis was carried out in the same manner as for Sb, except for preparing a 0.1 ppm As solution as a standard solution and a measurement wavelength of the ICP spectrometer was set at 193.696 nm.

[III] Analysis of Sulfide Ion
(1) The device shown in the FIGURE was used. The device has a hydrogen sulfide generating bottle 1 and a detector tube 2. The detector tube 2 is composed of a small-diameter portion and a large-diameter portion connected to the lower end of the small-diameter portion. The detector tube 2 is open at both ends thereof. The detector tube 2 is graduated from 0 to 1.5 ml in 0.01 ml divisions.

A sample weighing 100 g was weighed into the bottle 1. To the sample were added 40 ml of a tin (II) chloride solution (prepared by dissolving 8 g of tin (II) chloride in 500 g of 36% hydrochloric acid and adding water to make 1 liter) and 4 g of sandy zinc, whereby hydrogen sulfide gas generated in the bottle 1. The detector tube 2 packed with lead acetate silica gel was connected immediately to the bottle 1 by means of a rubber stopper 3. The "lead acetate silica gel" is a substance obtained by dissolving 5 g of lead acetate in 500 ml of methyl alcohol, adding 500 g of white silica gel (500-297 μm), mixing well, leaving the mixture to stand for about 10 minutes, spreading the mixture thin on a stainless steel vat, and drying the spread layer spontaneously. The upper and the lower ends of the small-diameter portion of the detector tube 2 were plugged with absorbent cotton 4, and the space therebetween was packed with the lead acetate silica gel. The lower end of the large-diameter portion of the detector tube 2 was also plugged with absorbent cotton 4 for stopping mist of the sample in the bottle 1 from rising through the detector tube 2.
(2) The hydrogen sulfide gas rose in the detector tube 2 to cause the white lead acetate in the detector tube 2 to change to brown lead sulfide. As a result, the color of the contents of the detector tube 2 changed upward gradually from white to brown. After the bottle 1 was allowed to stand in a water bath at 35° to 40° C. for about 1 hour, the detector tube 2 was removed. The detector tube 2 was tapped a few times against a table with its lower end down, and the volume of the packing having turned to brown (hereinafter, "discolored volume") was read in 0.01 ml.
(3) Separately from the operations (1) and (2) above, a calibration curve of the brown-discolored volume vs. amount of hydrogen sulfide (mg) was created. To create the calibration curve, a standard hydrogen sulfide solution for comparison was prepared as follows. In a 6 w/v % sodium hydroxide solution was dissolved 7 g of sodium sulfide, and water was added to make one liter to prepare a stock solution. The stock solution was subjected to iodometry to determine the titer. A portion of the stock solution accurately corresponding to 10 mg hydrogen sulfide was weighed out based on the titer. Water was added to the portion to make one liter, which was used as a standard solution for comparison. The standard solution for comparison contained 0.01 mg of $H_2S$ per milliliter.
(4) The thus prepared standard solution was put in the bottle 1 in an amount of 0 ml (hydrogen sulfide: 0 mg), 1.0 ml (hydrogen sulfide: 0.01 mg) or 5.0 ml (hydrogen sulfide: 0.05 mg), and water was added thereto to make about 50 ml. Into the bottle 1 were placed 50 ml of the tin (II) chloride solution and 4 g of sandy zinc to generate hydrogen sulfide gas. The operations described in (1) and (2) above were conducted to obtain the volume of the detector tube 2 having changed to brown for each of the amounts (0 ml, 1.0 ml, and 5.0 ml) of the standard solution for comparison. A calibration curve of the brown-discolored volume of the detector tube 2 vs. the amount (mg) of hydrogen sulfide was prepared.
(5) Calculation The amount (mg) of hydrogen sulfide was obtained from the brown-discolored volume of the detector tube 2 read out in (2) and the calibration curve. The amount (ppb) of the sulfide ions was calculated to two significant figures according to equation:

Sulfide ion concentration $(ppb)=(A \times 1000 \times 32.07/34.07 \times 1000)/$amount $(g)$ of sample where A is the amount (mg) of hydrogen sulfide corresponding to the discolored volume of the detector tube.

TABLE 1

|  | Example 1 | Example 2 | Example 3 | Example 4 | Comparative Example 1 |
|---|---|---|---|---|---|
| Temperature of 1st Step (° C.) | 35 | 58 | 40 | 35 | 65 |
| Aging Time & Temperature (° C./hr) | 35/2 | 55/2 | 38/2 | 35/2 | 64/2 |
| Temperature of 2nd Step (° C.) | 30 | 52 | 36 | 30 | 63 |
| Temperature of 3rd Stop (° C.) | 60 | 60 | 60 | 40 | 60 |
| Sb (ppb) | 20 | 170 | 40 | 2 | 450 |
| Sulfide Ion (ppb) | 20 | 150 | 40 | 190 | 380 |
| As (ppb) | 2 or less | 2 or less | 2 or less | 2 or less | 2 or less |

As is apparent from the results in Table 1, the high purity phosphoric acids obtained in Examples (the products of the invention) have an extremely low Sb content, As content and sulfide ion content. In contrast the phosphoric acid of Comparative Example contains considerable amounts of Sb and As and has a high sulfide ion content.

INDUSTRIAL APPLICABILITY

As hereinabove described, the high purity phosphoric acid according to the present invention has extremely low contents of antimony, an impurity metal that has hitherto been regarded difficult to remove, and sulfide ions. The high purity phosphoric acid of the invention is useful as an etching solution for semiconductor devices having a silicon nitride film, an etching solution for liquid crystal display panels having an alumina film, a metallic aluminum etching solution, an alumina etching solution for ceramics, a raw material of phosphate glass for optical fiber, a food additive, and so forth. The process according to the present invention allows for easy and economical production of such high purity phosphoric acid.

The invention claimed is:

1. High purity phosphoric acid having an Sb content of 200 ppb or less and a sulfide ion content of 200 ppb or less as impurity contents on a 85 weight percent $H_3PO_4$ basis.

2. The high purity phosphoric acid according to claim 1, obtained by a first step of blowing hydrogen sulfide gas in excess into crude phosphoric acid containing an impurity metal to precipitate the impurity metal in the form of a sulfide, a second step of filtering the phosphoric acid from the first step, and a third step of bringing the phosphoric acid from the second step into contact with air in a removal tower to remove hydrogen sulfide gas from the phosphoric acid, the first and the second steps being carried out at 59° C. or lower.

3. The high purity phosphoric acid according to claim 1 or 2, wherein the crude phosphoric acid is dry-process phosphoric acid obtained by burning yellow phosphorus to generate diphosphorus pentoxide gas and hydrating the gas.

4. The high purity phosphoric acid according to claim 1 or 2, which is for use in etching of an electronic device.

5. A process of producing high purity phosphoric acid comprising a first step of blowing hydrogen sulfide gas in excess into crude phosphoric acid containing an impurity metal to precipitate the impurity metal in the form of a sulfide, a second step of filtering the phosphoric acid from the first step, and a third step of bringing the phosphoric acid from the second step into contact with air in a removal tower to remove hydrogen sulfide gas from the phosphoric acid, the first and the second steps being carried out at 59° C. or lower,
the process further comprising the step of aging between the first and the second steps which is carried out at 59° C. or lower and for a time of 1 to 10 hours.

6. The process of producing high purity phosphoric acid according to claim 5, wherein the first step is carried out by bringing the crude phosphoric acid and the hydrogen sulfide gas into contact with each other in an absorption tower packed with a packing.

7. The process of producing high purity phosphoric acid according to claim 5, wherein the third step is carried out by bringing the phosphoric acid and air into contact in a removal tower packed with a packing.

8. The process of producing high purity phosphoric acid according to claim 5, wherein the crude phosphoric acid containing an impurity metal is dry-process phosphoric acid obtained by burning yellow phosphorus to generate diphosphorus pentoxide gas and hydrating the gas.

* * * * *